United States Patent [19]

Auge

[11] Patent Number: 5,202,793

[45] Date of Patent: Apr. 13, 1993

[54] THREE DIMENSIONAL IMAGE DISPLAY APPARATUS

[75] Inventor: Charles W. Auge, Elk Grove Village, Ill.

[73] Assignee: John Mc Carry, El Toro, Calif.

[21] Appl. No.: 618,363

[22] Filed: Nov. 23, 1990

[51] Int. Cl.$^5$ .......................................... G02B 27/22
[52] U.S. Cl. .................................................. 359/463
[58] Field of Search ................ 350/130, 131; 359/462, 359/463

[56] References Cited

U.S. PATENT DOCUMENTS

| | | | |
|---|---|---|---|
| 2,301,254 | 11/1942 | Carnahan | 358/88 |
| 2,307,188 | 1/1943 | Bedford | 358/88 |
| 2,621,247 | 12/1952 | Wright | 358/88 |
| 2,783,406 | 2/1957 | Vanderhooft | 313/70 |
| 2,865,988 | 12/1958 | Cafarelli | 350/88 |
| 2,883,906 | 4/1959 | Rehern | 350/132 |
| 2,931,855 | 4/1960 | Abramson | 358/88 |
| 3,165,578 | 1/1965 | Lauricelia | 358/88 |
| 3,334,179 | 8/1967 | Winnek | 358/88 |
| 3,457,364 | 7/1969 | Carrillo | 358/88 |
| 3,674,921 | 7/1972 | Goldsmith | 358/88 |
| 3,689,346 | 9/1972 | Rowland | 156/245 |
| 3,858,001 | 12/1974 | Bonne | 358/88 |
| 3,932,699 | 1/1976 | Tripp | 358/88 |
| 4,078,854 | 3/1978 | Yano | 350/130 X |
| 4,294,782 | 10/1981 | Froehlig | 264/1.4 |
| 4,399,456 | 8/1983 | Zalm | 358/92 |
| 4,410,804 | 10/1983 | Stauffer | 358/92 |
| 4,486,363 | 12/1984 | Pricone et al. | 264/1.4 |
| 4,541,007 | 9/1985 | Nagata | 358/92 X |
| 4,559,556 | 12/1985 | Wilkins | 358/88 |
| 4,562,463 | 12/1985 | Lipton | 358/92 X |
| 4,582,393 | 4/1986 | Shieman | 350/132 |
| 4,584,604 | 4/1986 | Guichard et al. | 358/92 |
| 4,588,259 | 5/1986 | Sheiman | 350/132 |
| 4,621,897 | 11/1986 | Bonnet | 350/130 |
| 4,719,507 | 1/1988 | Bos | 358/92 |
| 4,772,943 | 9/1988 | Nakagawa et al. | 358/92 |

FOREIGN PATENT DOCUMENTS

| | | |
|---|---|---|
| 262955 | 6/1988 | European Pat. Off. . |
| 2110623 | 9/1971 | Fed. Rep. of Germany . |
| 1382592 | 2/1975 | United Kingdom . |

*Primary Examiner*—Scott J. Sugarman
*Attorney, Agent, or Firm*—Allegretti & Witcoff, Ltd.

[57] ABSTRACT

An apparatus for three-dimensional display of a two-dimensional image such as that produced on a television screen or a photograph. The apparatus is an array of lens assemblies that are placed adjacent to the plane of the two-dimensional image. The lens assemblies comprise, in the preferred embodiment, an object lens, an image lens, and a semi-rigid transparent layer between the lenses. The apparatus can be modified to provide three-dimensional viewing of a projected image such as that produced by a slide projector by adding a secularly mirrored surface to the object lens.

1 Claim, 6 Drawing Sheets

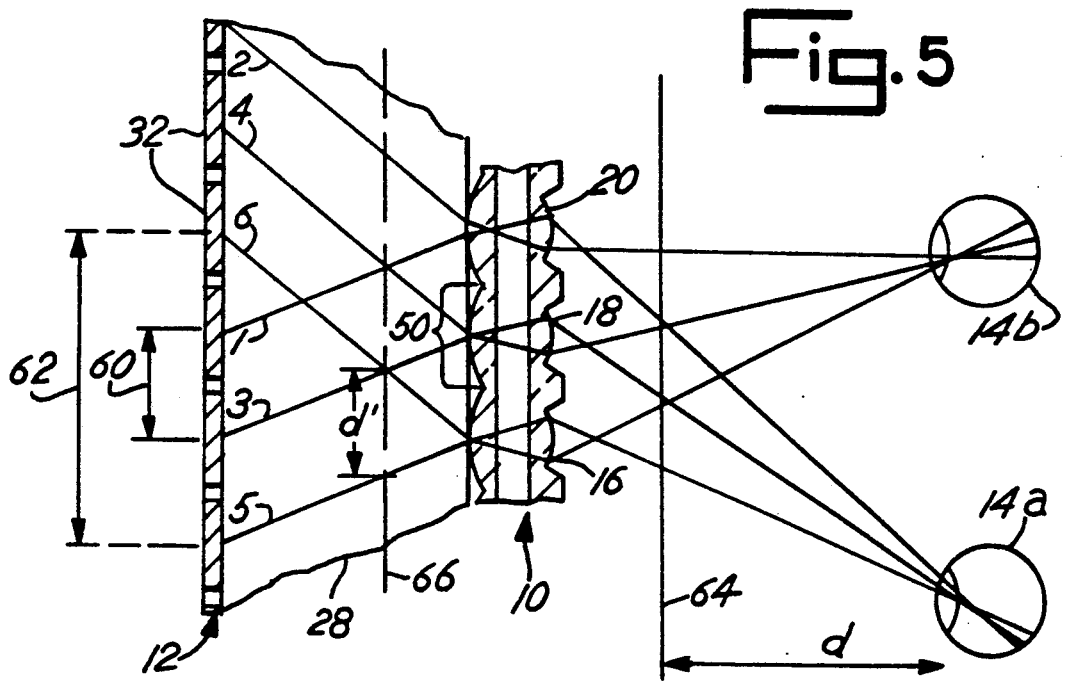
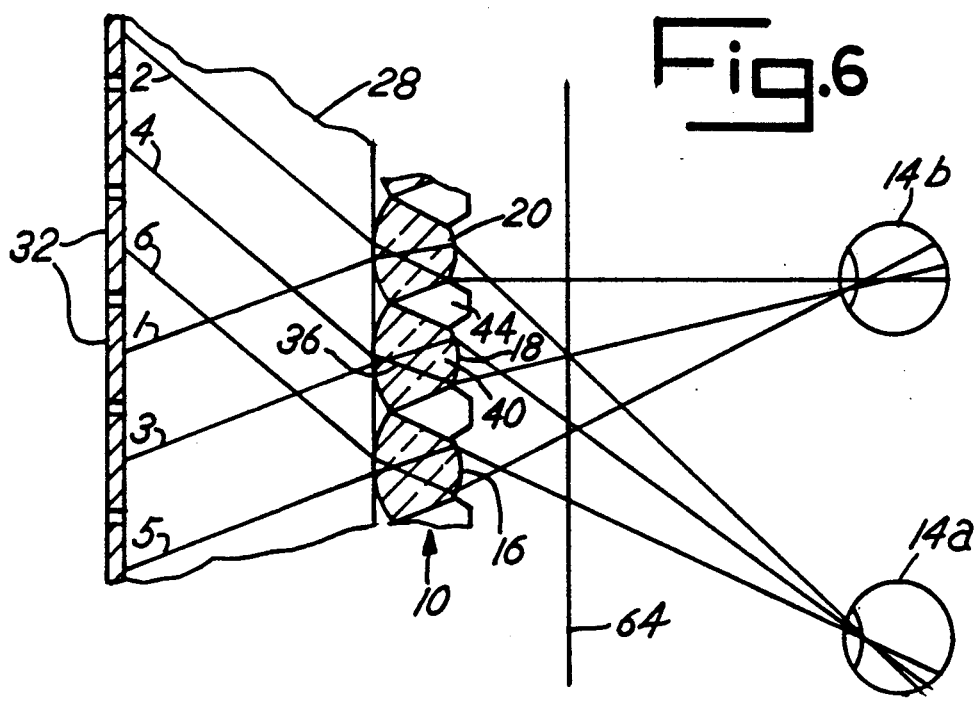

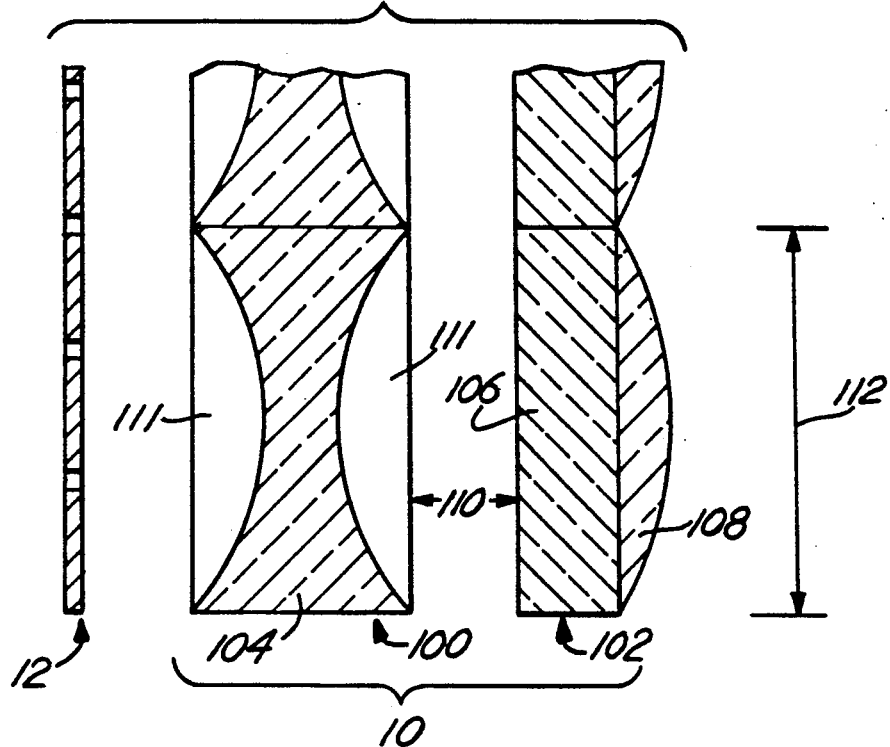
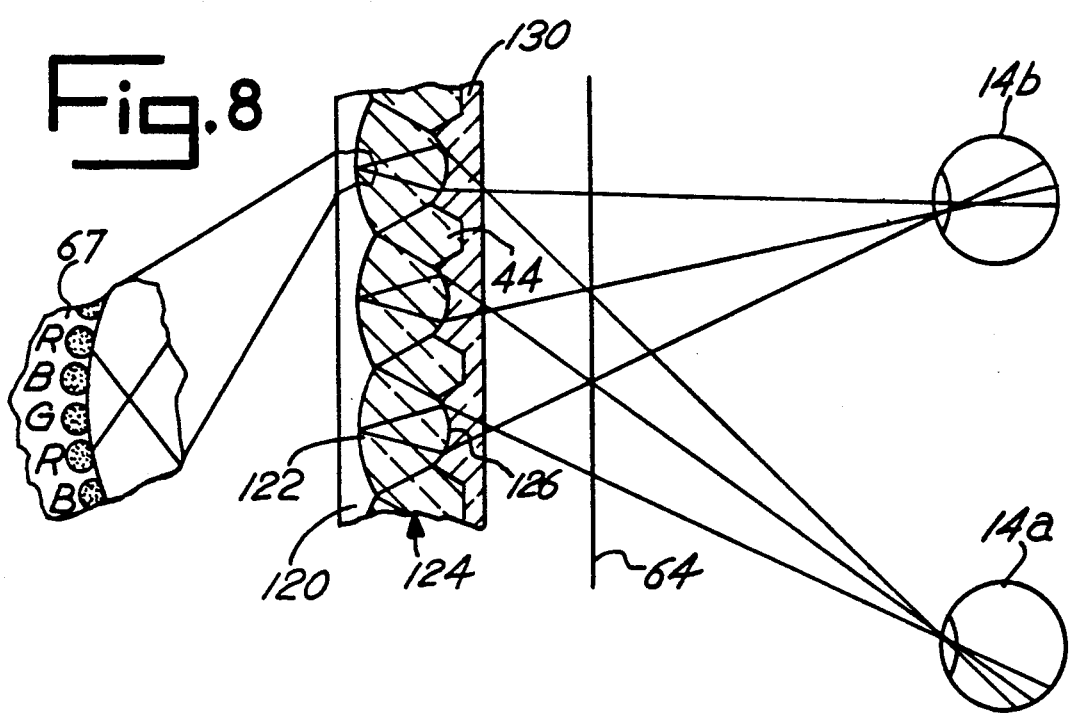

THREE DIMENSIONAL IMAGE DISPLAY APPARATUS

BACKGROUND OF THE INVENTION

1. Field of the Invention

This invention relates to three dimensional image display systems. More particularly, this invention relates to a new three dimensional image display system that is adaptable to any image producing source, whether television, print, movie screen, computer monitor, or other source.

2. Description of Related Art

Attempts have been made since at least the 1940's to produce a satisfactory, universal three dimensional image display system. The essential problem to be solved is the production of two independent images to the right and left eyes of an observer, which are combined in the brain to give the viewer a perception of depth.

The attempts at stereoscopic three dimensional image display have involved a wide variety of techniques, in a variety of media, with limited results. Additionally, the techniques known in the art typically involve some sort of complexity or hindrance, either singly or in combination. Such incumbrances have included cumbersome or expensive decoding glasses to be worn by the viewer, sophisticated and costly signal multiplexing, polarization or color filters, multivibrators, oscillators, multiple camera image generation and phase adjustment devices, and special strips, screens and filming techniques. Moreover, many three dimensional image display systems known heretofore produce a three dimensional image observable in a narrowly circumscribed location. Additionally, three dimensional image display techniques have heretofore been primarily directed to motion pictures, either in television or film projection. Consequently many image sources that contain 3-D information have never been used for 3-D viewing.

Three dimensional image display has a vast number of potential applications, if it can be produced simply, without the aid of mechanical or electrical contraptions, and in a variety of media. Home entertainment, theatre entertainment, medicine (e.g., x-ray analysis, surgery, diagnostic imaging), scientific research (e.g., computer modelling, cosmology) and advertising, are just a few of the possibilities. Unfortunately, the limitations in the state of the art up to now has curtailed application of three dimensional image display to places of amusement, leaving its wider applications in the home, the work place and the researh laboratory largely untouched.

The present invention overcomes and supersedes prior limitations in the art through the discovery of a method for three dimensional image display adaptable to virtually any two dimensional image that already contains three dimensional information. Ordinary two dimensional images, such as those produced on television sets, postcards, photographs, and computer screens, apparently already contain as an incident to their generation three dimensional image information. The information can be retrieved and displayed through the application of a conversion means lens assembly to the image such that adjacent pairs of picture elements are perceived by the right and left eyes independently. By the application of a conversion means lens assembly of the present invention, stereoscopic, three dimensional display can be achieved simply, at relatively low cost, and for virtually any two dimensional image source that has three dimensional information incidental to its image generation. The invention requires no filters, glasses, multiplexing, polarization, signal processing, or other electrical or mechanical device or procedure. Moreover, the conversion means lens assembly can be mass produced at low cost by currently available manufacturing technology.

Without prejudice to the scope of the appended claims, the applicant herein below sets forth what is believed to be the principle of operation of the invention, the summary of what applicant believes to be his invention, and a detailed description of how to make and use the invention as the applicant understands it.

SUMMARY OF THE INVENTION

An apparatus is provided for the three dimensional display of a two dimensional object plane comprising an optical system adjacent the object plane of the two dimensional image for separating adjacent image elements of the two dimensional object plane for independent viewing by the right and left eyes. The optical system, in the preferred embodiment, comprises a two dimensional array of lens assemblies.

The parameters of the optical system will vary depending on the application. The optical system's purpose is to take adjacent picture element of the two dimensional image and separate them to interpupillary distance so that one picture element is perceived by the left eye and the other is perceived by the right eye. The optical system incorporates lens assemblies arranged in a two dimensional array placed adjacent to the object plane to accomplish this objective. Without the lens assembly, groups of pairs of adjacent picture elements appear as a single element to the eyes, and the scene will be viewed as a two dimensional image. When the optical system is used, individual picture elements are separated to the right and left eyes, and the scene is viewed as a three dimensional scene. The conversion means is designed so that separation is accomplished without appreciable distortion, overlapping of images, or noticeable aberration.

The theory which the applicant understands the invention to be founded on is that with a 2-D image generated by an ordinary camera, the scene is perceived by a multiplicity of perspectives, the number being greater as the focal depth increases and the subject matter depth increases. The multiplicity of perspectives is contained within a multiplicity of closely spaced points, which, if separated by the optical system according to the present invention causing adjacent closely spaced object plane elements to be perceived by right and left eyes independently, gives the viewer a perception of depth.

The present invention can also be used in front projection formats, e.g., slides or movies. In this case, the object side of the conversion means lens assembly is specularly mirrored and replaces the existing front projection screens.

The present invention is also usable to create instant 3-D film pictures. A removable transparent encoding screen is placed between the conversion means lens assembly and the scene being photographed. The light sensitive media, color filters or diffraction grating of the film is placed in proximity of the object lens surface.

BRIEF DESCRIPTION OF THE DRAWINGS

The features, objects and advantages of a preferred embodiment of the present invention can be more easily understood by reference to the accompanying figures, in which:

FIG. 5 is a cross-sectional view of the optical system of FIG. 1 showing ray traces from the object plane to the viewers eyes, the optical system having lenses with a rigid transparent core;

FIG. 6 is a cross-sectional view similar to FIG. 5 except that the lenses do not have a rigid transparent core;

FIG. 7 is a cross-sectional view of a two-element lens in the array;

FIG. 8 is a cross-sectional view of a conversion means lens array and encoding means as applied to instant film;

DETAILED DESCRIPTION OF THE PREFERRED EMBODIMENT OF THE INVENTION

Figure 1:
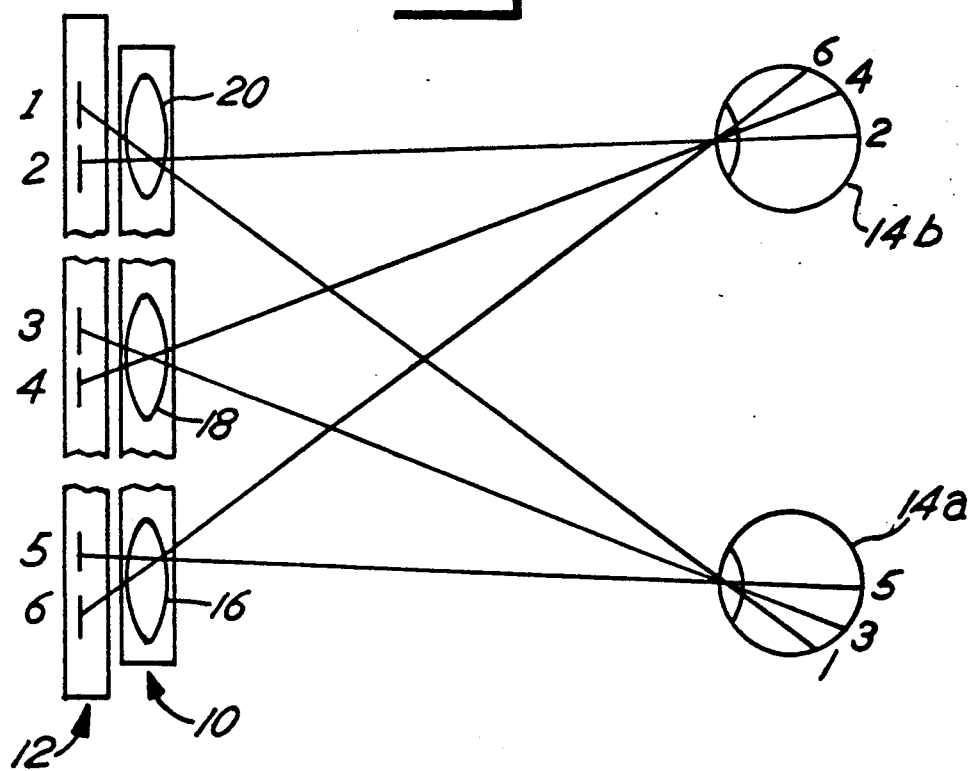
FIG. 1 is a simplified diagram of the optical system of the present invention applied to a generic 2-D image plane.

Referring to FIG. 1, a simplified diagram of the optical system 10 according to present invention is shown applied to a generic object plane 12. FIG. 1 is a horizontal planar cross-sectional view through the plane of the eyes 14a and 14b. The object plane 12 could be the surface of a TV screen, a newspaper photograph, a postcard, or any other planar image surface composed of closely spaced adjacent image elements. In FIG. 1, the object plane 12 is composed of a multitude of adjacent pairs of image elements, of which three pairs have been shown. Placed in front of the image plane is the optical system 10 of the present invention.

The optical system 10 is an array of conversion means lens assemblies. Three such lens assemblies are represented in FIG. 1, each of which, as the applicant understands the invention, separate the adjacent image elements of the object plane to the right and left eyes, as shown. Lens assembly 16 separates elements 5 and 6 such that the right eye 14b sees element 6 and the left eye 14a sees element 5. Similarly, lens assembly 18 separates elements 3 and 4 such that element 3 is seen by the left eye 14a and element 4 is seen by the right eye 14b. Similar separation is performed by lens assembly 20 on image elements 1 and 2. If an entire array of lens assemblies is placed in front of a 2-D object plane, the right and left eyes perceive two different perspective views of the 2-D image and the perception of depth.

Figure 2:
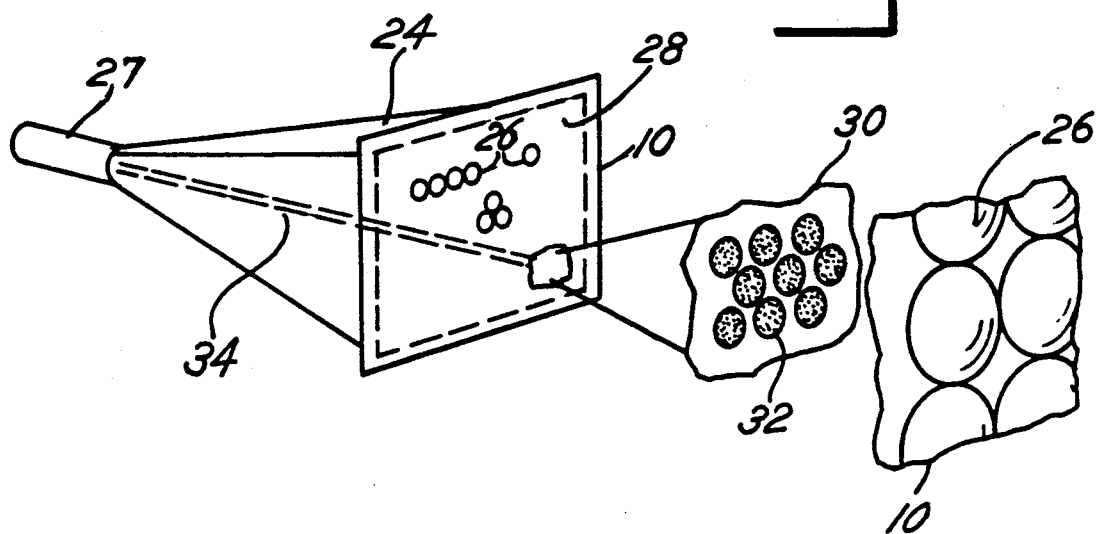
FIG. 2 is an oblique view of the optical system placed adjacent the image plane of a color television set.

For purposes of illustration of a preferred embodiment, FIG. 2 shows an oblique view of a television tube 24 having placed adjacent to it the optical system 10. The optical system 10 comprising a plurality of lens assemblies 26 arranged in an array which covers the TV screen 28. The broken away and enlarged portion 30 of TV screen 28 shows the linear array of red, green and blue phosphor dots 32 that are struck and illuminated by the beams of electrons 34 from the electron gun 36.

Figure 3:
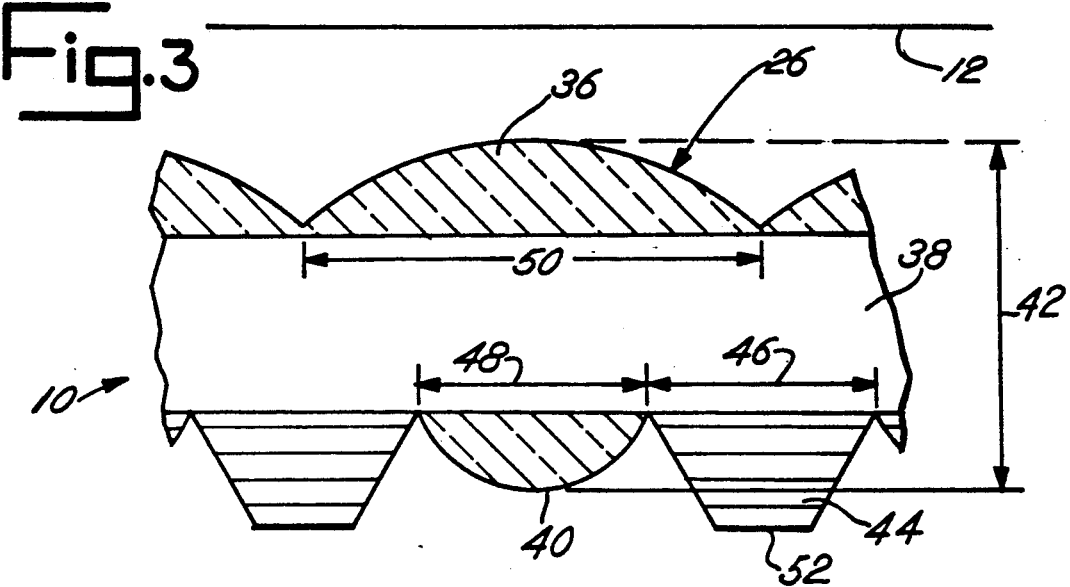
FIG. 3 is a cross-sectional view of a lens element in the array shown in FIG. 1.

FIG. 3 is a cross-sectional view of one lens assembly of FIG. 2, designed for minimum coma, minimum spherical aberration and absorption of ambient light. Each lens assembly 26 is made of an optically clear material with an index of refraction of 1.52. The lens assembly 26 comprises an object lens 36 which faces the object plane 12, a semi-rigid optically transparent layer 38, and an image lens 40. To minimize tangential coma and spherical aberration, the radii of curvature of object lens 36 and image lens 40 are in a ratio of thirteen to one. For the embodiment for use with a color television, object lens 36 is given a radius of curvature of 0.0234 inches. The distance 42 between the vertices of the object lens and the image lens 40 is 0.00473 inches.

To gain rigidity, the lens assembly 26 can be made with the semi-rigid optically transparent material 38 sandwiched between the object and image lenses 36 and 40. Preferably, the index of refraction of the layer 30 is substantially the same as that of the object and image lenses 36 and 40. The optically dead area of the lens assembly 26 is covered by a light absorbing buffer ring 44. The inner diameter 46 of the buffer ring 44 equals the diameter 48 of the image lens 40, which is one half the diameter 50 of the object lens 36. The buffer ring 44 has a flattened vertex region 52.

Figure 4:
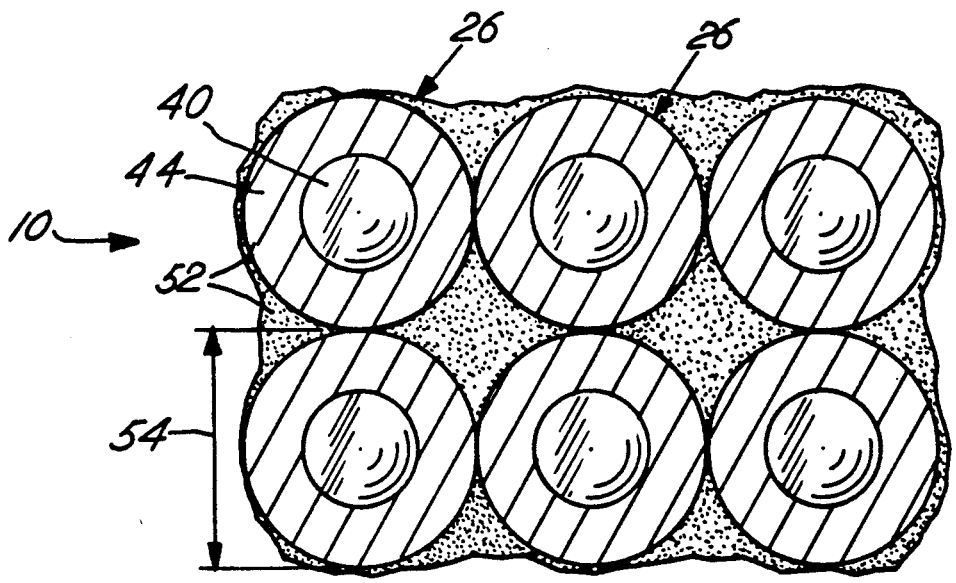
FIG. 4 is a front view of a section of the lens array shown in FIG. 3.

Referring now to FIG. 4, the lens assemblies 26 are shown arranged in a two-dimensional array. The image lens 40 is surrounded by the light absorbing buffer ring 44 and the vertex region 52 filling in the region external to the image lens 40. For the color television embodiment, the diameter 54 of each lens assembly is approximately 0.00751 inches.

FIG. 5 is a horizontal cross-sectional view in the plane of the viewer, with rays traced from the object plane 12 through the optical system 10 to the left and right eyes 14a and 14b. The phosphor dots 32 have an adjacent object element spacing 60, and a horizontal scan distance between like colored phosphor dots is designated by numeral 62.

The surface of television screen 28 (or other optically transparent cover of a conventional CRT) limits the proximity of the optical system 10 to the object plane 12. A plane 64 is selected at distance d from the viewer's eyes where the rays to the right and left eyes cross-over and do not interrupt the same lens. The distance d is the optimum distance to resolve all object plane detail. At plane 64, the distance between ray 3 to the right eye 14b and ray 4 to the left eye 14a must be equal to the distance d' at plane 66 for unity magnification.

From FIG. 5, it can be seen that red, blue and green rays 2, 4, and 6 are directed to the right eye 14b and red, blue and green rays 1, 3, and 5 are directed to the left eye 14a. Thus, the requirements of stereo separation are met in FIG. 5. Under ideal conditions, the object lens width 50 is equal to the adjacent object element spacing 60. However, depending on the size of the object elements to be resolved and separated to the right and left eyes, the lenses can be chosen to be larger or smaller, or placed at a farther or closer distance to the object plane 12. Generally, smaller lens sizes are desirable for wider fields of view with minimum distortion.

Referring now to FIG. 6, the array of lens assemblies are shown constructed without the semi-rigid optically transparent middle layer. The previous statements regarding radii of curvature, lens diameter and index of refraction of the lens assemblies of FIG. 3 apply here as well. In FIG. 5 stereo separation of rays 1-6 is accomplished by the lenses 16, 18, and 20. In FIG. 6, stereo separation of rays 1-6 is accomplished by the lenses 36 and 40.

In FIG. 7, an alternative construction for the optical system is shown in cross-section adjacent to an object plane 12. The optical system comprises a first lens array 100 and a second lens array 102. Each lens element of the first array 100 comprises a double concave lens 104 having radii of curvature of 0.067 inches. Transparent material 111 is air. The second lens array 102 has layer 106 of semi-rigid transparent material adjacent the lens 108. Lens 108 has a radii of curvature of 0.041 inches. A 0.005 inch separation 110 is provided between the first and second lens arrays. The index of refraction for lenses 104 and 108 is 1.49, and the diameter or width of each lens element 112 is 0.040 inches. Again, the size and spacing of the lenses may vary depending on the size of the image elements to be resolved, the distance to the viewer's eyes, and other factors.

Referring now to FIG. 8, the optical system 10 is shown applied to instant film. The instant film media 120 is applied in proximity to the object lens surface 122 of a conversion lens array 124 which is part of the film pack. A removable encoding means 130 making intimate contact with the image lens surface 124 is also included with the film in the film pack. The silver crystal, dye combination, or diffraction grating 67 is the source of ray 1 directed to the left eye 14a, and ray 2 directed to the right eye 14b, by the conversion lens array 124, thereby producing stereo separation. Encoding means 130 makes the image appear on the film as if the conversion lens array 124 were not present. When the film is developed the encoding means 130 is removed and the instant 3-D picture is viewable. If 3-D is not desired, the encoding means is left intact since it will protect the lenses of the array 124.

Figure 9:
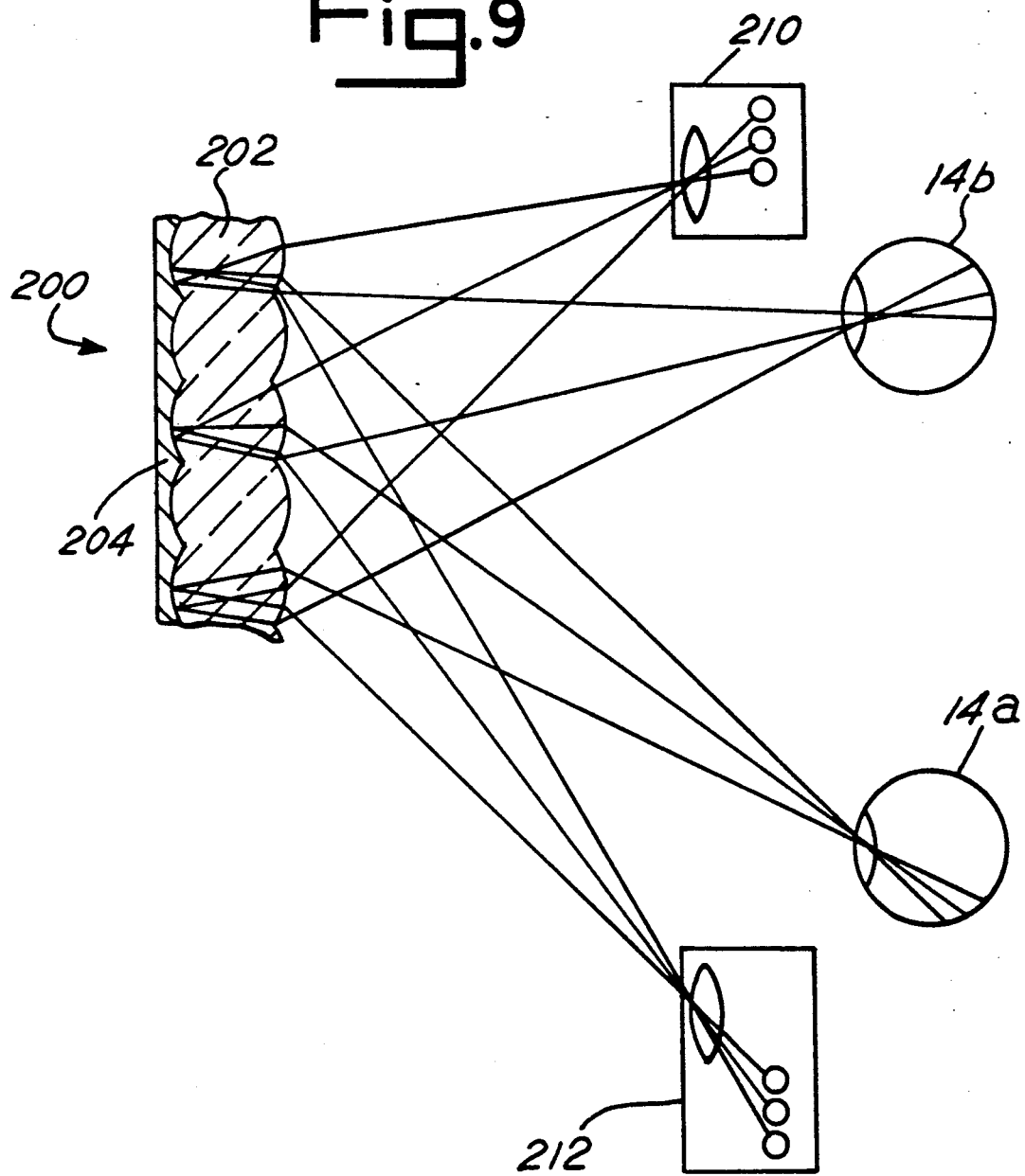
FIG. 9 is a cross-sectional view of a conversion means lens array as applied in a front projection application.

FIG. 9 shows the principle of the invention using a front projection conversion lens array. An optical system 200 comprising an array of lens assemblies 202 has a secularly mirrored surface 204 applied to the back of the array. A right image is projected onto the array by projector 210 and a left image is projected by projector 212. Rays from the right projector 210 are directed to right eye 14b by the optical system 200. Likewise, rays from the left projector 212 are directed to left eye 14a. The result is a 3-D image observed by the viewer or viewers.

It is not necessary to have two projections 210 and 212 for film not originally filmed as independent left-right images, nor is it necessary that the number of projectors be limited to one or two. When a single projector is used the rays from the secularly mirrored surface 204 are in the order of the rays from object plane 12 in FIG. 5.

COMPOSITION AND MANUFACTURE OF CONVERSION MEANS LENS ARRAYS

The manufacture of the conversion means lens assembly 10 can be by a variety of methods, the choice depending on the degree of expense one is willing to incur or the degree of accuracy and performance one requires of the optical system. As one possibility, laser light deformation of optical quality translucent plastics with the proper indices of refraction, to form convex lens surfaces of the desired radii of curvature, will provide a superior optical system, but at relatively high initial engineering and production costs.

Figure 10:
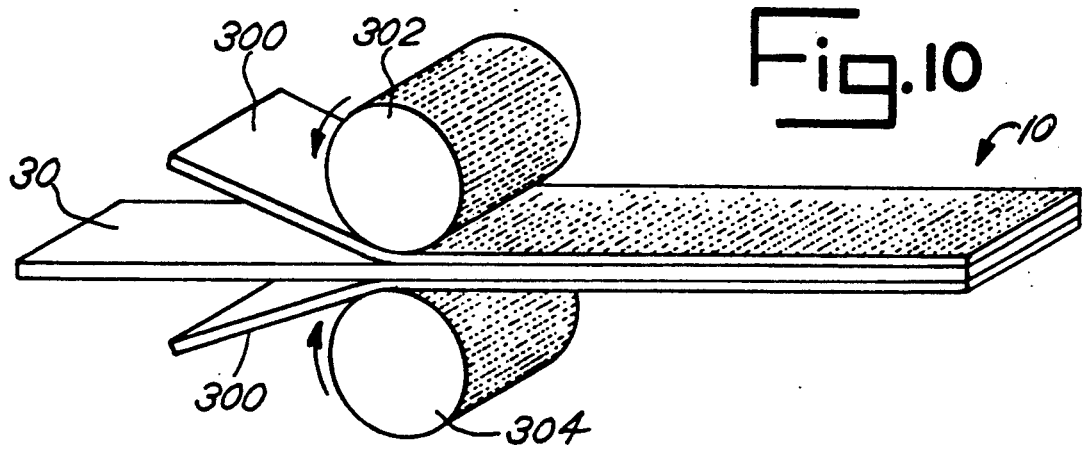
FIG. 10 is a diagram of a method of manufacturing UV curable plastic lens arrays.

Referring to FIG. 10, plastic sheeting 300 is given the proper curvatures and shapes by heated metal rolling dies 302 and 304. Two layers of plastic sheeting 300 are formed over a transparent semi-rigid core material 30 and are conformed to the proper shape by the pattern on rolling dies 302 and 304, thus producing the optical system 10 in one operation. With proper choice of materials for the plastic sheeting 300, no mold release is required. This method will produce large volumes of medium to high quality optical systems 10 at low cost per unit.

Figure 11:
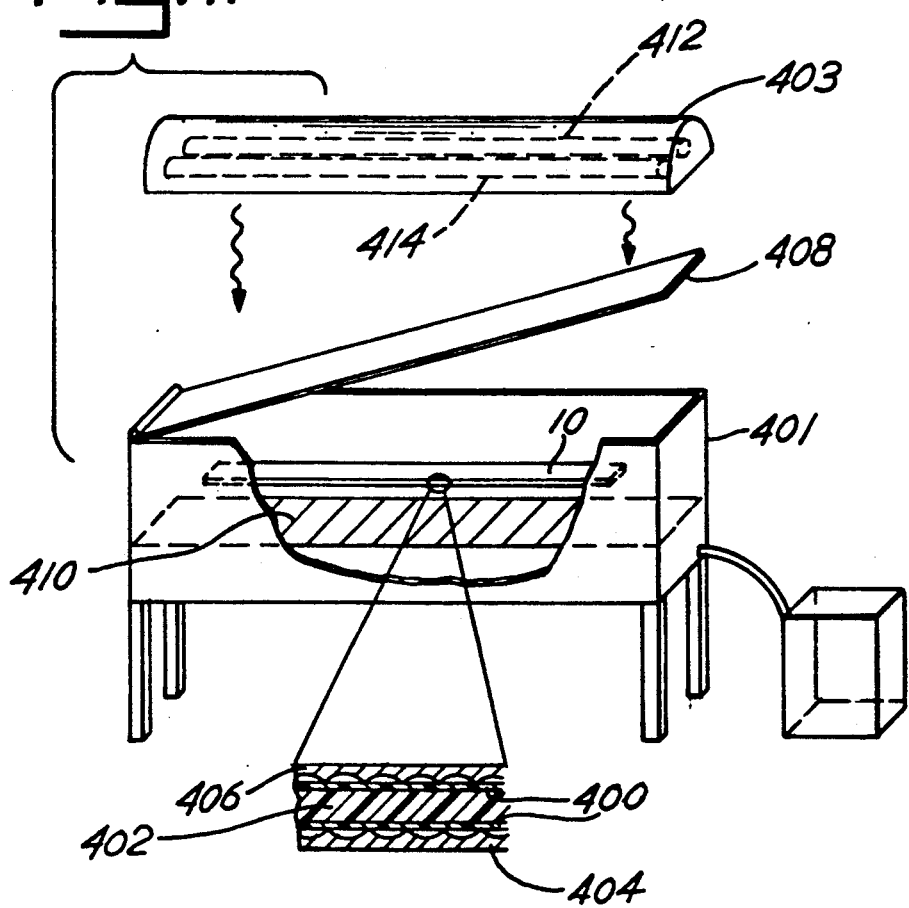
FIG. 11 is a diagram of a heated roller method of manufacturing lens arrays.

At the low budget end of the spectrum, see FIG. 11. A vacuum frame 401 and ultraviolet light and infrared heater assembly 403 are used to form the optical systems 10. A sandwich is made of upper and lower plastic film sheets 400 which have UV curable optically clear plastic 402 sandwiched between them. This assembly, along with a rigid lower mold 404 and a thin UV transmitting upper mold 406 are placed in the vacuum frame 401. The transparent cover 408 of the vacuum frame is closed and vacuum is applied to the frame 401, causing the blanket 410 to be forced against cover 408 and thus squeezing the UV curable plastic and thin plastic sheets 400 into the mold indentations in upper and lower molds 406 and 404. The vacuum frame is maintained at a constant temperature by the infrared heater 412. The molding process is observed.

When the plastic layer 402 is evenly dispersed, the UV light 414 is turned on, curing the plastic 402.

The foregoing description of preferred and alternative embodiments are illustrative examples of the essential teaching disclosed herein. Considerable variation in the parameters of the optical systems disclosed here may be desirable or necessary for other media and image sources, depending upon the size of the adjacent picture elements to be separated, the distance to the viewer, and other factors. The scope of the present invention as defined in the appended claims is intended to cover all such modifications from the embodiments disclosed herein.

Furthermore, as noted, the conversion means lens assembly is adaptable to a variety of image producing sources, for example, printed photographs, and computer monitors, besides television sets. Accordingly, the scope of the present invention is intended to cover all such uses of the optical systems disclosed herein.

What is claimed is:

1. An apparatus for viewing a two-dimensional image, said two-dimensional image composed of a multiplicity of adjacent image elements generated from a single view and defining an object plane, comprising:
   a two-dimensional array of lens assemblies placed closely adjacent said object plane for separation of said adjacent image elements for independent viewing by the right and left eyes, each of said lens assemblies comprising an object lens and an image lens, said object lens facing said object plane and said image lens facing the viewer.

* * * * *